3,178,411
Patented Apr. 13, 1965

3,178,411
6-LOWER ALIPHATIC HYDROCARBON SUBSTITUTED DERIVATIVES OF THE PREGNANE SERIES

Philip F. Beal III and Melvin A. Rebenstorf, Kalamazoo, Mich., assignors to The Upjohn Company, Kalamazoo, Mich., a corporation of Michigan
No Drawing. Filed July 25, 1958, Ser. No. 750,876
22 Claims. (Cl. 260—239.55)

The present invention relates to steroid compounds and is concerned with 6-lower aliphatic hydrocarbon substituted derivatives selected from the class consisting of androstanes, pregnanes and sterols, the corresponding 11-hydroxy and 11-keto substituted compounds, the intermediates therefor and a process of production thereof. In all designations of the 6-substituent in this application wherein either, 6α or 6β is possible, the 6α-configuration is intended.

The new compounds and the process of the present invention are illustratively represented by the following formulae:

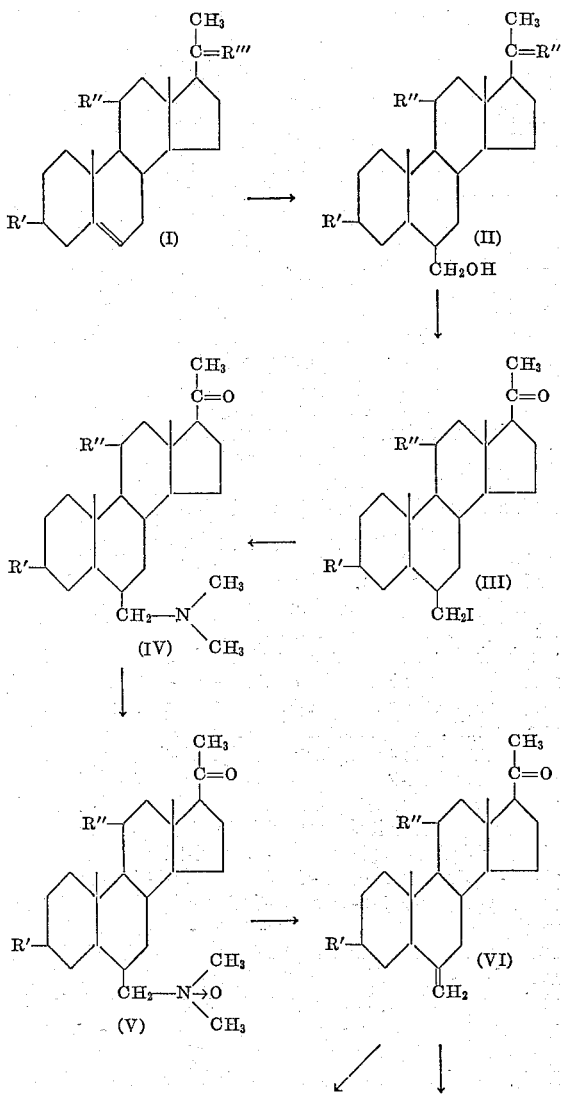

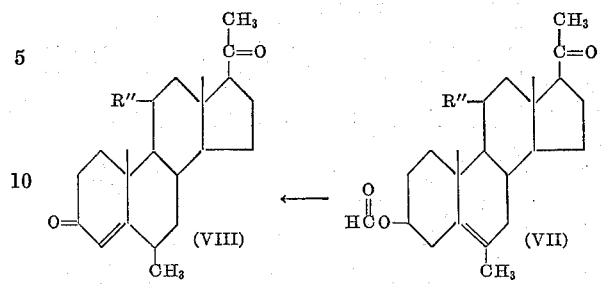

wherein R''' is selected from the group consisting of =O and a glycol ketal radical

wherein R is an alkylene radical containing from one to eight carbon atoms, inclusive, and the attaching oxygen to carbon bonds are separated by a chain of at least two and not more than three carbon atoms, inclusive, and wherein R'' is selected from the group consisting of hydrogen, hydroxy or keto and R' is selected from the group consisting of an acyloxy radical, AcO, wherein Ac is the acyl radical of a hydrocarbon carboxylic acid containing from one to twelve carbon atoms, inclusive, hydroxy, or a glycol ketal radical

wherein R is an alkylene radical containing from one to eight carbon atoms, inclusive, and the attaching oxygen to carbon bonds are separated by a chain of at least two and not more than three carbon atoms, inclusive.

The process of the present invention for the production of a 6-methyl steroid compound selected from the class consisting of androstenes, pregnenes and sterols comprises: hydroxymethylation at the 6-position of the non-conjugated double bond or a steroid compound or the 3-acylate or a 3,20-bisketal (I) thereof by reacting said steroid compound with carbon monoxide and hydrogen in the presence of a suitable catalyst under pressure to produce a 6-hydroxymethyl steroid compound such as 6-hydroxymethyl-3-acetoxypregnan-20-one (II); halogenating the thus produced 6-hydroxymethyl steroid compound by reacting with a halogenating agent such as triphenylphosphite methiodide, triphenylphosphite hydrochloride or triphenylphosphite hydrobromide is productive of a corresponding 6-halomethyl steroid compound such as 6-iodomethyl-3-acetoxypregnan-20-one (III); reacting the thus-produced 6-halomethyl steroid compound with a dialkylamine to produce a 6-dialkylaminomethyl steroid compound such as 6-dimethylaminomethyl-3-acetoxypregnan-20-one (IV); oxidizing the thus produced 6-dialkylaminomethyl steroid compound with an oxidizing agent such as hydrogen peroxide, peracetic acid or perbenzoic acid to produce an amine oxide of a 6-dialkylaminomethyl steroid compound such as 6-dimethylaminomethyl-3-acetoxypregnan-20-one N-oxide (V); decomposing the thus produced amine oxide of a 6-dialkylaminomethyl steroid compound by heating under vacuum or atmospheric pressure to produce a 6-methylene steroid compound such as 6-methylene-3-acetoxypregnan-20-one (VI); when the thus produced 6-methylene steroid compound contains a 3-acylate substituent, dissolving in 98 percent formic acid and heating is productive of the 3 formate of the 6-methyl 5,6-unsaturated steroid compound, e.g., 6-methyl-5-pregnen-3β-ol-20-one formate (VII) which on subsequent treatment by conventional Oppenauer oxidation consisting of refluxing with an appropriate carbonyl reagent such as acetone, cyclohexanone or quinone and a solvent such as benzene, xylene or toluene and a metal alkoxide such as aluminum isopropoxide is productive of a 6-methyl steroid compound (VIII), e.g., 6-methyl-progesterone, whereas when the 6-methylene steroid contains a keto group at the 3-position, e.g., 6-methylene-pregnane-3,20-dione, dissolving in 98 percent formic acid and heating is directly productive of a 6-methyl steroid compound (VIII).

The starting compounds of the instant invention are chosen from those steroid compounds structurally susceptible to hydroxymethylation by means of the oxo-reaction, e.g., those possessing an unconjugated double bond, for example, an unconjugated 5,6-double bond. The oxo process has long been known in the synthetic organic chemical industry and has been extensively utilized in large scale operations involving tonnage production. The process is an outgrowth of the Fischer-Tropsch catalytic synthesis of higher hydrocarbons and oxygenated compounds from carbon monoxide and hydrogen. The oxo reaction has been widely used for the addition of carbon monoxide and hydrogen to an olefin in the presence of a cobalt catalyst to produce an aldehyde containing one carbon atom more than the starting compound. The reaction may be regarded as consisting of the addition of a hydrogen atom and a formyl group across the double bond. The reaction was first carried out using ethylene and the resulting products were propionaldehyde and diethyl ketone. It has been employed since by many investigators to produce a large variety of compounds. Wender et al. [J. Amer. Chem. Soc., 73, 2656 (1951)] utilized it to synthesize ethylbenzene, 2-phenylpropanol and 2-phenylpropionaldehyde from 2-phenylpropionaldehyde and to produce toluene and 2-phenylethanol from benzyl alcohol. Wender et al. also employed the oxo process [J. Amer. Chem. Soc. 72, 4375 (1951)] in converting furan to tetrahydrofurfuryl alcohol and octene-1 to nonyl alcohols; in [J. Amer. Chem. Soc. 71, 4160 (1949)] they report the formation of isoamyl alcohol from tertiary butyl alcohol. Adkins and Krsek [J. Amer. Chem. Soc. 71, 3051 (1949)] converted butyl vinyl ether to α-butoxypropionaldehyde. Berty and Marko [Acta Chim. Acad. Sci. Hung, 3, 177 (1953)] used a one-step process to obtain alcohols containing three and four carbon atoms from olefins.

Cobalt catalysts have been uniformly successful in the oxo reaction. In the presence of sufficient carbon monoxide and hydrogen, nearly all cobalt salts and freshly reduced cobalt metal react at about 125 to 150 degrees centigrade to give a mixture of dicobalt octacarbonyl and cobalt hydrocarbonyl.

The oxo reaction is operated successfully in the temperature range of 125 to 200 degrees centigrade and total gas pressures ranging from 1000 to 3000 pounds per square inch gauge. Dicobalt octacarbonyl is formed from most cobalt salts at about 150 degrees centigrade, so if lower reaction temperatures are desired it is preferable to prepare the catalyst beforehand and introduce it into the reaction mixture rather than attempt to form the cobalt carbonyl in situ during the reaction.

The novel oxo reaction according to this invention can be carried out on any unconjugated steroid double bond, e.g.,

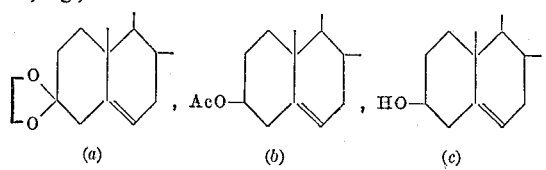

(a)    (b)    (c)

In the present invention the oxo process has been employed to bring about hydroxymethylation at the 6-position of the steroid nucleus. The starting substances employed are chosen from steroid compounds represented by the structures shown by (a), (b) and (c) above. Steroids selected from (a) are prepared as shown in Preparations 1, 2 and 3 and those represented by (b) are synthesized by the method of Fieser and Huang-Minlon, J. Am. Chem. Soc. 71, 1840 (1949)]. Formula (c) illustratively represents such known sterols as sitosterol, stigmasterol, ergosterol, cholesterol, brassicasterol, campesterol, fucosterol and the like. In general, starting materials can be chosen from steroid compounds represented by the following formula:

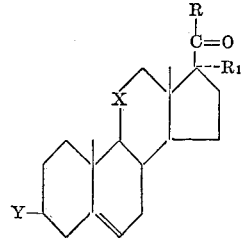

wherein:
Y=ketal, hydroxy or acyloxy
X=methylene, α and β-hydroxymethylene or carbonyl
R=methyl, hydroxymethyl or acyloxymethyl
$R_1$=hydrogen, hydroxy or acyloxy In carrying out the process of the present invention pre-prepared dicobalt octacarbonyl can be used as a catalyst or a cobalt salt employed in situ as in Example 1A. The preferred solvent to be used in the 6-hydroxymethylation of steroid compounds has been found to be toluene, but other hydrocarbons and alcohols can be utilized. The reaction can be carried out at temperatures between 125 and 200 degrees centigrade, however the preferred temperature range for hydroxymethylation is 170 to 200 degrees centigrade. Total gas pressures ranging from 1000 to 3000 pounds per square inch gauge composed of approximately equal partial pressures of carbon monoxide and hydrogen can be employed in this process. In the preferred embodiment of the instant invention total gas pressures varying from 1200 to 1600 pounds per square inch gauge consisting of approximately equal partial pressures of carbon monoxide and hydrogen are used.

It is an object of the present invention to provide 6-methyl compounds of the androstane, pregnane and sterol series. (The sterols comprise a group of crystalline alcohols possessing a substituted tetracyclic perhydrocyclopentaphenanthrene nucleus derived from the nonsapionifiable fraction of lipides from various plant and animal sources). The compounds produced include: 6-methlyprogesterone, 6-methyl-11-hydroxyprogesterone, 6-methyl-11-ketoprogesterone, 6-methylsterols and intermediates for the production thereof such as 6-hydroxymethylpregnane-3,20-dione 3,20-bis-(ethylene ketal), 6-hydroxymethylpregnane-3,11,20-trione 3,20-bis-(ethylene ketal), 6-hydroxymethyl-11-hydroxypregnane-3,20-dione 3,20-bis-(ethylene ketal), 6-hydroxymethyl-3-acyloxypregnan-20-one, 6-hydroxymethyl-epiandrosterone, 6-hydroxmethyl-17-methyl-5-androsten-3,17-diol, 6-hydroxymethylsitostanol, 6-iodomethylpregnane-3,20-dione, 6-iodomethylpregnane-3,11,20-trione, 6-iodomethyl-11-hydroxypregnane-3,20-dione, 6-iodomethyl-3-acyloxypregnan-20-one, 6-iodomethylsitostanol, 6-dimethylaminomethylpregnane-3,20-dione, 6-dimethylaminomethylpregnane-3,11,20-trione, 6-dimethylaminomethyl-11-hydroxypregnane-3,20-dione, 6-dimethylaminomethyl-3-acyloxypregnan-20-one, 6-dimethylaminomethylsitostanol, 6-dimethylaminomethyl-pregnane-3,20-dione N-oxide, 6-dimethylaminomethyl-pregnane-3,11,20-trione N-oxide, 6-dimethylaminoethyl-11- hydroxypregnane-3,20-dione N-oxide, 6-dimethylaminomethyl-3-acyloxypregnan-20-one N-oxide, 6-dimethylaminomethylsitostanol N-oxide, 6-methylenepregnane-3,20-dione, 6-methylenepregnane-3,11,20 trione, 6-methylene-11-hydroxypregnane-3,20-dione, 6-methylene-3-acyloxypregnan-20-one, and 6-methylpregnanolone 3-formate. It is another object of the instant invention to provide a process for the production of the aforesaid 6-methyl steroid compounds and the intermediates thereof.

6-methyl-progesterone and the 11-hydroxy and keto derivatives thereof produced by one of the novel processes of the present invention have utility as intermediates in the production of 1-dehydro-6-methyl-hydrocortisone, 6-methylhydrocortisone, 6-methylcortisone and esters thereof. All of these compounds possess marked glucocorticoid and anti-inflammatory activity in excess of hydrocortisone and 1-dehydro-hydrocortisone and are therefore employable in the treatment of arthritis. 6-methyl-11-hydroxyprogesterone which can be produced in accordance with the present invention exhibits strong anti-inflammatory activity and in addition exerts little or no salt retention. The strongly glucocorticoid and anti-inflammatory steroid compounds, 6-methylcortisone, 6-methylhydrocortisone and 1-dehydro-6-methylhydrocortisone and esters thereof can be produced from starting steroids such as 6-methyl-11-ketoprogesterone, which are readily synthesized by employing the process of the present invention. The 6-hydroxymethyl, 6-iodomethyl, 6-dimethylaminomethyl, 6-dimethylaminomethyl N-oxide and 6-methylene derivatives of the sterols sitosterol, stigmasterol, ergosterol, cholesterol and the like, which can be produced in accordance with the processes of the present invention are useful as grease bases for lipsticks and as modifiers of oil-water emulsions such as lotions for improved protection of human skin. These conversions are delineated as follows:

*6-methylcortisone, 6α-methylhydrocortisone and 1-dehydro-6-methylhydrocortisone from 6-methyl-11-ketoprogesterone*

(a) 6-METHYL-3,11-DIKETO-4,17(20)-PREGNADIENE-21-OIC ACID METHYL ESTER

A solution of 6.84 grams (0.02 mole) of 6-methyl-11-keto-progesterone (6α and 6β-epimers) in seventy milliliters of tertiarybutyl alcohol was prepared by heating to 55–60 degrees with stirring under a nitrogen atmosphere. While the temperature was held at this point 11.7 grams of ethyl oxalate was added. Thereafter 2.7 grams of sodium methoxide in methanol (commercial 25% solution) was added. Almost immediately the yellow precipitate of the disodium enolate of 6-methyl-21,21-diethoxyoxalyl-11-ketoprogesterone began to precipitate. The temperature was maintained at fifty to sixty degrees centigrade for fifty minutes after which the mixture was allowed to cool slowly to approximately 35 degrees centigrade in the next fifteen minutes.

A solution of 2.44 grams of anhydrous sodium acetate and 3.00 grams of glacial acetic acid in 160 milliliters of methanol which had been previously cooled to ten degrees centigrade was then added and the mixture stirred until the solution was achieved. The yellow solution was cooled to zero degrees and treated dropwise with vigorous stirring with a pre-cooled (to zero degrees centigrade) solution of 9.6 grams of bromine in 96 milliliters of methanol. Approximately 75 milliliters of the bromine solution was added at a constant rate during ten minutes. The rate of addition was then decreased and the remaining 21 milliliters added during the following ten minutes. After an additional ten-minute stirring period, the bromine color had essentially disappeared.

With continuous stirring and cooling a solution of 5.57 grams of sodium methoxide in methanol (commercial 25 percent solution) was added rapidly. A bright orange color developed which soon faded to yellow amber. The cooling bath was removed, the temperature raised to 25–30 degrees centigrade and the solution stirred for 1.5 hours. During this period crystallization occurred, the precipitated material being the 2-bromo-6-methyl-3,11-diketo-4,17(20)-pregnadiene-21-oic acid methyl ester.

Sixteen milliliters of acetic acid and 3.2 grams of zinc dust was added to this material and stirring continued for a period of thirty minutes. The excess zinc dust was removed by filtration and washed with fifteen to twenty milliliters of fresh methanol. The combined filtrate was concentrated at reduced pressure in a sixty-degree water bath to approximately a 200-milliliter volume. The concentrate was poured slowly with stirring into 750 milliliters of ice and water. The mixture was refrigerated for fifteen minutes and then filtered. The filter cake was washed with 100 milliliters of cold water and dried at room temperature. The slightly gummy crude product, 6-methyl-3,11-diketo-4,17(20)-pregnadiene-21-oic acid methyl ester weighed 7.02 grams (94.8 percent yield).

1.5 gram portion of the crude material was dissolved in fifty milliliters of benzene and poured onto a chromatographic column, previously charged with 75 grams of Florisil synthetic magnesium silicate. The column was eluted with 750 milliliters of five percent acetone-95 percent Skellysolve B hexane, 1200 milliliters of eight percent acetone-92 percent Skellysolve B hexane, 300 milliliters of twelve percent acetone-88 percent Skellysolve B hexane, and 150 milliliters of 100 percent acetone. The eluate was collected in 150-milliliter fractions and evaporated. Fractions 5–10, inclusive, contained 939 milligrams of crystalline product which was recrystallized from methanol to give 660 milligrams of white needles of pure 6-methyl-3,11-diketo-4,17(20)-pregnadien-21-oic acid methyl ester of melting point 227–229 degrees centigrade, $[\alpha]_D$ plus 131 degrees in chloroform;

$\lambda^{ethanol}_{max}$ (95%) 234 millimicrons, $a_M = 23,110$

*Analysis.*—Calcd. for $C_{23}H_{30}O_4$: C, 74.56; H, 8.16. Found: C, 74.65; H, 8.12.

(b) 6-METHYL-11β,21-DIHYDROXY-4,17(20)-PREGNADIEN-3-ONE 3-PYRROLIDINE ENAMINE

A solution of 0.5 gram of 6-methyl-3,11-diketo-4,17(20)-pregnadien-21-oate methyl ester, 0.5 milliliter of pyrrolidine, forty milliliters of benzene and twenty milligrams of p-toluenesulfonic acid was heated under reflux for one hour. The solvent was distilled under vacuum. Trituration of the residue with methanol gave 398 milligrams of a yellow solid (68.2 percent yield) of the 3-pyrrolidine enamine of 6-methyl-3,11-diketo-4,17(20)-pregnadien-21-oic acid methyl ester of melting point 136–148 degrees centigrade and λ max. 272 millimicrons (measured in five percent water plus 95 percent methanol); $a_M = 21,450$; λ max 224 millimicrons, $a_M = 16,650$; λ max. 360 millimicrons, $a_M = 1,200$.

*Analysis.*—Calcd. for $C_{27}H_{37}NO_3$: C, 76.56; H, 8.81; N, 3.31. Found: C, 76.42; H, 9.02; N, 3.37.

(c) 3-PYRROLIDINE ENAMINE OF 6-METHYL-11β,21-DIHYDROXY-4,17(20)-PREGNADIEN-3-ONE

To a suspension of 1.1 grams of lithium aluminum hydride in 75 milliliters of anhydrous ether was added 1.3 grams of the crude 3-pyrrolidine enamine of 6-methyl-3,11-diketo-4,17(20)-pregnadien-21-oic acid methyl ester. The reaction mixture was heated under reflux for one hour. The excess lithium aluminum hydride was destroyed by the addition of ethyl acetate. Water was added until a pasty mass of lithium salts were formed. The supernatant liquid was decanted and evaporated yielding 1.17 grams of a yellow oil consisting essentially of the 3-enamine of 6-methyl-11β,21-dihydroxy-4,17(20)-pregnadien-3-one.

(d) 6α-METHYL-11β,21-DIHYDROXY-4,17(20)-PREGNADIEN-3-ONE

The yellow oil consisting of impure 3-enamine 6-methyl-11β,21-dihydroxy-4,17(20)-pregnadien-3-one was dissolved in twenty milliliters of methanol containing two milliliters of five percent sodium hydroxide. After 1.5 hours at 26 degrees centigrade the solution was neutralized with acetic acid, and the crude product, 1.13 grams, was obtained by extraction after distillation of the methanol. This material was chromatographed over Florisil and a fraction of 306 milligrams obtained by elution with Skellysolve B containing twenty percent acetone was recrystallized from ethyl acetate to give 240 milligrams of 6α - methyl-11β,21-dihydroxy-4,17(20)-pregnadien-3-one of melting point 178–179 degrees centigrade.

(e) 6α-METHYL-11β-HYDROXY-21-ACETOXY-4,17(20)-PREGNADIEN-3-ONE

A solution of 100 milligrams of 6-methyl-11β,21-dihydroxy 4,17(20)-pregnadien-3-one in one milliliter of pyridine was mixed with one milliliter of acetic anhydride and the whole was then maintained at room temperature for a period of seventeen hours, whereafter crushed ice was added thereto. The oily precipitate, 6α-methyl-11β-hydroxy-21-acetoxy-4,17(20)-pregnadien-3-one, was extracted with three ten-milliliter portions of methylene chloride, the methylene chloride extracts dried over anhydrous sodium sulfate, evaporated and the residue, 111 milligrams, recrystallized from ethyl acetate-Skellysolve B to give 6α-methyl-11β-hydroxy-21-acetoxy-4,17(20)-pregnadien-3-one of melting point 136–139 degrees centigrade.

(f) 6α-METHYLHYDROCORTISONE ACETATE 100 milligrams of 6α-methyl-11β-hydroxy-21-acetoxy-4,17(20)-pregnadien-3-one were dissolved in six milliliters of tertiary butyl alcohol and 0.05 milliliter of pyridine. To this mixture was added 1.6 milligrams of osmium tetroxide and 0.21 milliliter of N-methylmorpholine oxide peroxide (equal to 35.8 milliliters of a tenth normal sodium thiosulfate solution). After stirring at 26 degrees centigrade for a period of two hours, excess sodium hydrosulfite solution was added. The solvent was distilled in a vacuum and the product extracted with methylene dichloride. The material was chromatographed over Florisil anhydrous magnesium silicate and the fraction consisting of Skellysolve B hexanes with fifteen percent acetone was separated, and evaporated to give 52 milligrams of crystalline 6α-methylhydrocortisone acetate of melting point 213–214 degrees centigrade.

*Analysis.*—Calcd. for $C_{24}H_{34}O_6$: C, 68.87; H, 8.19. Found: C, 68.60; H, 8.41.

(g) 6α-METHYL-11β,17α,21-TRIHYDROXY-4-PREGNENE-3,20-DIONE (6α-METHYLHYDROCORTISONE)

A solution was prepared containing 0.5 gram of 6α-methyl - 11β,17α-dihydroxy-21-acetoxy-4-pregnene-3,20-dione in 25 milliliters of methanol. This solution was purged with oxygen free nitrogen for a period of five minutes and thereafter was added a similarly oxygen purged solution of 0.250 gram of potassium bicarbonate, dissolved in one milliliter of methanol and one milliliter of water. The mixture was allowed to stand for three hours in a nitrogen atmosphere, then neutralized with hydrochloric acid, poured into 200 milliliters of ice water and the thus obtained mixture extracted with four portions of fifty milliliters of methylene chloride. The methylene chloride extracts were combined, washed several times with water, dried over anhydrous sodium sulfate and evaporated to give 6α-methylhydrocortisone which was recrystallized three times from methanol and water to give pure 6α-methylhydrocortisone of melting point 203 to 208 degrees centigrade.

*Analysis.*—Calcd. for $C_{22}H_{32}O_5$: C, 70.18; H, 8.57. Found: C, 70.32; H, 8.50.

(h) 6α-METHYLHYDROCORTISONE BENZOATE

A mixture of 500 milligrams of 6α-methylhydrocortisone, five milliliters of pyridine and five milliliters of benzoyl chloride was allowed to stand at room temperature for a period of eight hours. Thereafter the mixture was poured into excess of water, the water extracts neutralized with sodium bicarbonate and thereupon the mixture refrigerated. The mixture was then filtered and the thus obtained 6α-methylhydrocortisone benzoate recrystallized from methanol to give pure 6α-methylhydrocortisone benzoate.

In the same manner as given above, treating in pyridine solution:

(α) 6α-methylhydrocortisone with propionic anhydride yielded 6α-methylhydrocortisone 21-propionate (β) 6α-methylhydrocortisone with butyric anhydride yielded 6α-methylhydrocortisone 21-butyrate (i) 6α-METHYLCORTISONE To 760 milligrams (2.02 millimoles) of 6α-methylhydrocortisone (6α - methyl-11β,17α,21-trihydroxy-4-pregnene-3,20-dione) in 32 milliliters of methanol was added 0.67 milliliter of pyridine, 1.34 milliliters of water and 560 milligrams (4.04 millimoles) of N-bromoacetamide. The reaction mixture was held at twelve degrees centigrade overnight when titration of an aliquot indicated that approximately 1.1 mole equivalents of oxidant had been used. At this time sixty milliliters of a dilute solution of sodium sulfite (containing 400 milligrams of sodium sulfite) was added to destroy excess N-bromoacetamide and the mixture was concentrated under reduced pressure to about 55 milliliters until copious crystallization occurred. The mixture was cooled to zero degrees centigrade, maintained at this temperature for three hours and filtered to yield 610 milligrams of 6α-methylcortisone.

Since the product gave a positive Beilstein test, it was dissolved in 36 milliliters of acetic acid and treated with 1.2 grams of powdered zinc at room temperature for two hours. The mixture was filtered and the filtrate concentrated to ten milliliters under reduced pressure. The addition of fifty milliliters of water caused crystallization. The crystals were filtered off and washed with water and dried to yield 360 milligrams of 6α-methylcortisone of melting point 207–207.5. Recrystallization from acetone gave 230 milligrams of melting point 212.5–215 degrees. The infrared absorption spectrum of 6α-methylcortisone in Nujol mineral oil is as follows:

OH _____ 3400 cm.$^{-1}$ 3305 cm.$^{-1}$
11- and 20-keto _____ 1717 cm.$^{-1}$ 1700 cm.$^{-1}$
Conjugated 3-keto _____ 1652 cm.$^{-1}$
$\Delta^4$-double bond _____ 1604 cm.$^{-1}$ Treating 6α-methylhydrocortisone or 6α-methylcortisone with *Septomyxa affinis* in a nutrient solution preferably in the presence of 3-ketobisnor-4-cholen-22-al produces the respective 1-dehydro compounds, 1-dehydro-6α-methylhydrocortisone and 1-dehydro-6α-methylcortisone which are extremely active glucocorticoid steroids without salt-retaining activity.

Another method to produce 1-dehydro-6-methylhydrocortisone is as follows:

(j) 1-DEHYDRO - 6α - METHYLHYDROCORTISONE FROM 6α-METHYL-11β,21-DIHYDROXY-4,17(20)-PREGNADIEN-3-ONE

Five 100-milliliter portions of a medium in 250-milliliter Erlenmeyer flasks containing one percent Cerelose corn sugar, two percent corn steep liquor (60 percent solids) and tap water was adjusted to pH of 4.95. This medium was sterilized for one hour at twenty pounds per square inch pressure and 120 degrees centigrade and inoculated with a one to two day growth of *Septomyxa affinis* A.T.C.C. 6737. The Erlenmeyer flaks were shaken at room temperature at about 24 degrees centigrade for a period of three days. At the end of this period, this 500-milliliter volume was used as an inoculum for ten liters of the same glucose-corn steep liquor medium which in addition contained ten milliliters of an antifoam (a mixture of lard oil and octadecanol). The fermentor was placed into the water bath, adjusted to 28 degrees centigrade, and the contents stirred (300 r.p.m.) and aerated (0.5 l. air/minute/10 l. beer). After nineteen hours of incubation, when a good growth developed and the acidity rose to pH 6.65, two grams of 6α-methyl-11β,21-dihydroxy-4,17(20)-pregnadien-3-one, dissolved in fifty milliliters of acetone was added and the incubation (conversion) carried out at the same temperature and aeration for nineteen hours (final pH 8.0). The mycelium was filtered off and the steroidal material was extracted with four three-liter portions of methylene chloride. The mycelium was extracted with two 500-milliliter portions of acetone and two 500-milliliter portions of methylene chloride. The extracts were combined, evaporated and the residue chromatographed over 160 grams of Florisil synthetic magnesium silicate taking 320-milliliters fractions as follows:

TABLE II

| Fraction | Solvent |
|---|---|
| 1–4 | Skellysolve B hexanes plus 3% acetone. |
| 5–8 | Skellysolve B hexanes plus 6% acetone. |
| 9–12 | Skellysolve B hexanes plus 9% acetone. |
| 13–16 | Skellysolve B hexanes plus 12% acetone. |
| 17 | Skellysolve B hexanes plus 15% acetone. |
| 18 | Do. |
| 19 | Do. |
| 20 | Do. |
| 21 | Skellysolve B hexanes plus 20% acetone. |
| 22 | Do. |
| 23 | Do. |
| 24 | Do. |
| 25 | Skellysolve B hexanes plus 50% acetone. |
| 26 | Do. |

Fractions 18 to 25 were combined, evaporated to give 1.81 grams and the residue rechromatographed over 120 grams of Florisil taking 240-milliliter fractions.

TABLE III

| Fraction | Solvent |
|---|---|
| 1–4 | Skellysolve B hexanes plus 12% acetone. |
| 5–8 | Skellysolve B hexanes plus 15% acetone. |
| 9 | Skellysolve B hexanes plus 17.5% acetone. |
| 10 | Do. |
| 11 | Do. |
| 12 | Do. |
| 13 | Skellysolve B hexanes plus 20% acetone. |
| 14 | Do. |
| 15 | Do. |
| 16 | Do. |
| 17–20 | Skellysolve B hexanes plus 30% acetone. |

Fractions 9–16 were combined and evaporated to give 1.349 grams of an oily material.

This oil, crude 6α-methyl-11β,21-dihydroxy-1,3,17(20)-pregnatrien-3-one was dissolved in a mixture of five milliliters of pyridine and four milliliters of acetic anhydride at 25 degrees centigrade and the mixture was allowed to stand for a period of 3.5 hours. Thereafter the reaction mixture was poured into 100 milliliters of ice water and the aqueous mixture extracted with three 75-milliliter portions of methylene chloride. The methylene chloride portions were evaporated and chromatographed over 100 grams of Florisil synthetic magnesium silicate taking 200-milliliter fractions as follows:

TABLE IV

| Fraction | Solvent |
|---|---|
| 1–8 | Skellysolve B hexanes plus 3% acetone. |
| 9–12 | Skellysolve B hexanes plus 6% acetone. |
| 13 | Skellysolve B hexanes plus 9% acetone. |
| 14 | Do. |
| 15 | Do. |
| 16 | Do. |
| 17 | Skellysolve B hexanes plus 12% acetone. |
| 18 | Do. |
| 19 | Do. |
| 20 | Do. |
| 21–24 | Skellysolve B hexanes plus 15% acetone. |

Fractions 14–19 were combined to yield 1.095 gram of partially crystalline material. After three recrystallizations from Skellysolve B-hexane an analytical sample of 6α-methyl-11β-hydroxy-21-acetoxy-1,4,17(20)-pregnatrien-3-one was obtained of melting point 132 to 134 degrees centigrade, rotation $[\alpha]_D$ plus 109 degrees in chloroform, $\lambda_{max}^{EtOH}$ 243 m$\mu$, $a_M = 15{,}000$

*Analysis.*—Calcd. for $C_{24}H_{32}O_4$: C, 74.97; H, 8.39. Found: C, 75.17; H, 8.09.

To 622 milligrams of the above steroid, dissolved in 25 milliliters of tertiary butyl alcohol containing 0.8 milliliter of pyridine, was added four millimoles of N-methyl morpholine oxide peroxide in 2.0 milliliters of tertiary butyl alcohol and 9.8 milligrams of osmium tetroxide in 3.4 milliliters of tertiary butyl alcohol. The mixture was stirred at room temperature (about 22 to 24 degrees centigrade) for ninety minutes at which time twelve milliliters of 0.5 percent aqueous sodium sulfite solution was added. The reaction mixture was stirred for a period of twenty minutes, 25 milliliters of water was added and the tertiary butyl alcohol removed under reduced pressure. The mixture was extracted three times with 25-milliliter portions of methylene dichloride. The extracts were combined, washed with 0.5 normal hydrochloric acid and twice with water, then dried with anhydrous sodium sulfate, filtered, and the filtrate concentrated to dryness to yield 670 milligrams of an oil. The oil was chromatographed over sixty grams of Florisil synthetic magnesium silicate taking fractions of sixty milliliters as follows:

TABLE V

| Fraction | Solvent |
|---|---|
| 1–4 | Skellysolve B hexanes plus 3% acetone. |
| 5–8 | Skellysolve B hexanes plus 4% acetone. |
| 9–16 | Skellysolve B hexanes plus 7% acetone. |
| 17–22 | Skellysolve B hexanes plus 10% acetone. |
| 23–27 | Skellysolve B hexanes plus 15% acetone. |
| 28–30 | Skellysolve B hexanes plus 20% acetone. |
| 31–38 | Skellysolve B hexanes plus 50% acetone. |
| 39–42 | Acetone. |

Fractions 31 and 32 were combined and crystallized from acetone to give three fractions, Fraction A 160 milligrams of melting point 207 to 231 degrees centigrade, Fraction B 120 milligrams of melting point 210 to 230 degrees centigrade, and Fraction C 40 milligrams of melting point 200 to 204 degrees centigrade.

Fraction A was hydrolyzed with potassium bicarbonate in aqueous methanol solution to give in eighty percent yield 1-dehydro-6α-methylhydrocortisone of melting point 223 to 226.5 degrees centigrade.

Fraction B was recrystallized from acetone-Skellysolve B to give 65 milligrams of 1-dehydro-6-methylhydrocortisone acetate of melting point 205 to 208 degrees centigrade.

*Analysis.*—Calcd. for $C_{24}H_{32}O_6$: C, 69.21; H, 7.74. Found: C, 69.11; H, 7.67.

Rotation $[\alpha]_D$ was plus 101 degrees in dioxane and ultraviolet absorption spectra $\lambda$ was 243 millimicrons; $a_M = 14{,}825$.

The following preparations and examples are illustrative of the products and processes of the present invention, but are not to be construed as limiting.

PREPARATION 1

*11α-hydroxyprogesterone 3,20-bis-(ethylene ketal)*

A solution was prepared containing ten grams of 11α-hydroxyprogesterone (U.S. Patent 2,666,070), 0.5 gram of para-toluenesulfonic acid in 200 milliliters of benzene and twenty milliliters of ethylene glycol. This solution was refluxed for three and one half hours using a water trap to remove the water formed in the reaction. After this period of reflux, the solution was cooled and water was added. The aqueous layer was separated and washed with ether and the ether extracts added to the organic layer. The total organic layers were then successively washed with five percent sodium bicarbonate solution, saturated sodium chloride solution, water and then dried over sodium sulfate. The solvents were removed by distillation and the thus obtained residue was recrystallized from methanol to give in two crops 7.31 grams of 11α-hydroxyprogesterone 3,20-bis-(ethylene ketal) which when recrystallized from acetone had a melting point of 215 to 220 degrees centigrade.

PREPARATION 2

*11-ketoprogesterone 3,20-bis-(ethylene ketal)*

In the same manner as shown in Preparation 1, except that 11-ketoprogesterone is the starting steroid, there is thus-produced 11 - ketoprogesterone 3,20 - bis - (ethylene ketal).

PREPARATION 3

*Progesterone 3,20-bis-(ethylene ketal)*

In the same manner as shown in Preparation 1, except that progesterone is the starting steroid, there is thus produced progesterone 3,20-bis-(ethylene ketal).

In the same manner as shown in Preparation 1 other progesterone 3,20-bis-(ketals) are prepared by reacting at reflux temperature 11α-hydroxyprogesterone, 11-ketoprogesterone or progesterone in benzene, toluene, hexane, heptane, or other solvents with 1,2-alkane diols or 1,3-alkane diols such as propylene glycol, butane-1,2-diol, butane-1,3-diol, pentane-1,2- and 1,3-diol, hexane-1,2- and 1,3-diol, heptane-1,2- and 1,3-diol, octane-1,2- and 1,3-diol, or other alkane diols of the formula:

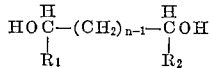

wherein $n$ is an integer having a value from one to two, inclusive, and $R_1$ and $R_2$ are selected from the group consisting of hydrogen and lower alkyl radicals containing up to six carbon atoms and wherein the total number of carbon atoms in the alkane diol is up to and including eight carbon atoms, in the presence of a strong acid such as toluene-sulfonic acid, orthochlorobenzenesulfonic acid, sulfuric acid, and the like, to obtain the corresponding 11α-hydroxy, 11-keto or progesterone 3,20-bis-(alkylene ketal). Representative 11α-hydroxy, 11-keto and progesterone bis-ketals prepared include the 11α-hydroxyprogesterone 3,20-bis-(1,2-propylene ketal), 3,20-bis-(1,3-propylene ketal), 1,2- and 1,3-butylene diketal, 1,2- 1,3- and 3,4-pentylene diketal, 11-ketoprogesterone 3,20-bis-(1,3-propylene ketal), progesterone 3,20-bis(1,2 - propylene ketal), and the like.

EXAMPLE 1

*6-hydroxymethyl-3β-acetoxypregnan-20-one (6-hydroxymethylpregnanolone acetate)*

A 500 milliliter autoclave was charged with thirty grams of 5-pregnenolone acetate [Fieser and Huang-Minlon, J. Am. Chem. Soc. 71, 1840 (1949)], 4.5 grams of dicobalt octacarbonyl and 450 milliliters of toluene. The autoclave was sealed and flushed three times with carbon monoxide. Carbon monoxide was admitted until a pressure of 600 pounds per square inch gauge was reached, then the pressure in the autoclave was brought to 1230 pounds per square inch gauge with hydrogen. The autoclave was heated with agitation at 180 degrees centigrade for eighteen hours. After heating was discontinued and the autoclave allowed to come to room temperature, the pressure had fallen 280 pounds per square inch gauge. The gases were vented and the contents of the autoclave removed. The toluene was removed in vacuo, the residue dissolved in alcohol and filtered through Celite (a diatomaceous earth). On standing overnight some of the product crystallized from the filtrate. The mixture was reheated to effect solution and filtered through Celite to remove the catalyst. The solvent was then removed in vacuo and the residue recrystallized from a mixture of Skellysolve B (hexane hydrocarbons) and acetone mixture. The first crop weighed 20.7 grams and had a melting point of 125 to 140 degrees centigrade. A portion of this product (2.00 grams) was chromatographed over Florisil (a synthetic magnesium silicate) to check purity and 1.65 grams of 6-hydroxymethylpregnanolone acetate having a melting point of 149 to 151 degrees centigrade was obtained on elution.

*Analysis.*—Calcd. for $C_{24}H_{38}O_4$: C, 73.81; H, 9.81. Found: C, 73.81; H, 9.82.

A second fraction contained the 3-formate of the above hydroxymethyl product.

*Analysis.*—Calcd. for $C_{25}H_{38}O_5$: C, 71.74; H, 9.15. Found: C, 71.73; H, 8.86.

EXAMPLE 1A

*6-hydroxymethyl-3-acetoxypregnan-20-one*

A 500 milliliter autoclave was loaded with thirty grams of 5-pregnenolone acetate, 1.5 grams of cobalt carbonate, in situ catalyst and 150 milliliters of toluene. The autoclave was sealed and flushed three times with carbon monoxide. Carbon monoxide was admitted until a pressure of 650 pounds per square inch gauge was reached, then the pressure in the autoclave was brought to 1320 pounds per square inch gauge with hydrogen. The autoclave was heated with agitation at 180 degrees centigrate for twelve hours. After heating was discontinued and the autoclave allowed to come to room temperature, the pressure had fallen 340 pounds per square inch gauge. The gases were vented and the contents of the autoclave removed. The toluene solution was filtered through Celite and the solvent removed in vacuo. The residue was redissolved in 200 milliliters of boiling alcohol and the mixture allowed to stand over the week-end. The mixture was then filtered through Celite and the solvent removed in vacuo. The residue was recrystallized from Skellysolve B (hexane hydrocarbons)-acetone to yield 7.2 grams of crystalline product with a melting point of 130–145 degrees centigrade. A two gram sample was chromatographed over Florisil to yield a single fraction (1.78 grams) which on recrystallization from a mixture of Skellysolve B and acetone gave 1.51 grams of 6-hydroxymethyl-3-acetoxypregnan-20-one crystals melting at 144 to 148 degrees centigrade.

EXAMPLE 2

*6-hydroxymethylpregnane-3,11,20-trione 3,20-bis-(ethylene ketal)*

A 500 milliliter autoclave was charged with ten grams of 11-ketoprogesterone 3,20-bis-(ethylene ketal) [5-pregnene-3,11,20-trione 3,20-bis(ethylene ketal)] (from Preparation 2), 1.5 grams of cobalt octacarbonyl and 150 milliliters of toluene. Carbon monoxide was admitted until a pressure of 680 pounds per square inch gauge is attained, then the pressure in the autoclave was brought to 1370 pounds per square inch of gauge with hydrogen. The autoclave was heated with agitation at 180 degrees centigrade for twelve hours. After heating discontinued and the autoclave allowed to come to room temperature, the presure had fallen ten pounds per square inch gauge. The gases were vented and the contents of the autoclave removed and filtered through Celite. The solvent was removed in vacuo and chromatographed over a column of Florisil. Three fractions were eluted from the column. The fraction eluted with a mixture of five percent acetone and 95 percent of Skellysolve B was crystalline and weighed three grams, while the second fraction eluted with ten to fifteen percent acetone in Skellysolve B was non-crystalline and weighed 4.02 grams. Neither of these fractions exhibited hydroxy absorption in the infrared spectrum. The third fraction was eluted with a mixture of twenty percent acetone and eighty percent Skellysolve B and yielded 1.22 grams of crystalline material which showed both 11-keto and hydroxyl absorption. A sample of this product, 6-hydroxymethylpregnane-3,11,20-trione 3,20-bis-(ethylene ketal), was recrystallized from a mixture of acetone and Skellysolve B and had a melting point of 221 to 226 degrees centigrade.

Analysis.—Calcd. for $C_{26}H_{40}O_6$: C, 69.61; H, 8.99. Found: C, 69.25; H, 8.66.

EXAMPLE 3

6-hydroxymethyl-11α-hydroxypregnane-3,11,20-trione 3,20-bis(ethylene ketal)

In the same manner as shown in Example 2, except that 11α-hydroxyprogesterone 3,20-bis-(ethylene ketal) (from Preparation 1) is the starting steroid, there is thus produced 6-hydroxymethyl-11α-hydroxypregnane-3,20-dione 3,20-bis(ethylene ketal).

EXAMPLE 4

6-hydroxymethylpregnane-3,20-dione 3,20-bis-(ethylene ketal)

In the same manner as shown in Example 2, except that progesterone 3,20-bis-(ethylene ketal) (from Preparation 3) is the starting steroid, there is thus produced 6-hydroxymethylpregnene-3,20-dione 3,20 - bis - (ethylene ketal).

EXAMPLE 5

(a) 6-hydroxymethylpregnane-3,20-dione 3,20-bis(ketals)

(b) 6-hydroxymethylpregnane-3,11,20-trione 3,20-bis-(ketals)

(c) 6-hydroxymethyl-11α-hydroxypregnane-3,20-dione 3,20-bis-(ketals)

In the same manner as shown in Example 2, except that the starting steroids employed are the representative 3,20-bis-(ketals) disclosed at the end of the second paragraph of Preparation 3, there is thus produced the corresponding 6-hydroxymethyl-3,20-bis-ketals, such as 6-hydroxymethylpregnane-3,20-dione bis-(1,2-propylene ketal), 6-hydroxymethylpregnane - 3,11,20 - trione, 3,20-bis-(1,3-butylene diketals) and 6-hydroxymethyl-11α-hydroxypregnane-3,20-dione 3,20-bis-(1,2-propylene ketal).

EXAMPLE 6

6-hydroxymethylsitostanol

A 500 milliliter autoclave was charged with 10.35 grams of sitosterol, 150 milliliters of toluene and one gram of pre-prepared dicobalt octacarbonyl catalyst. The autoclave was sealed and flushed three times with carbon monoxide. Carbon monoxide was admitted until a pressure of 800 pounds per square inch of gauge was reached, the pressure in the autoclave was brought to 1600 pounds per square inch gauge with hydrogen. The autoclave was heated with agitation at 180 degrees centigrade for six hours. After heating was discontinued and the autoclave allowed to cool to room temperature, the gases were vented and the contents of the autoclave removed and filtered to recover a crystalline product that weighed 4.62 grams. This material was recrystallized from alcohol. The first crop of 6-hydroxymethylsitostanol crystals weighed 2.47 grams and had a melting point of 208 to 210 degrees centigrade; the second crop weighed 1.46 grams and melted at 205 to 208 degrees centigrade; the third crop weighed 0.10 gram and melted at 200 to 204 degrees centigrade.

Analysis.—Calcd. for $C_{30}H_{54}O_2$: C, 80.65; H, 12.18. Found: C, 80.63; H, 11.68.

In the same manner as shown in Example 6, except that the starting sterols employed are stigmasterol, ergosterol, cholesterol and the like, there is thus produced the corresponding 6-hydroxymethyl derivatives.

EXAMPLE 7

6-iodomethyl-3β-acetoxypregnan-20-one (6-iodomethylpregnanolone acetate)

A mixture of 4.3 grams of triphenylphosphite methiodide, 2.9 grams of 6-hydroxymethylpregnanolone acetate and five milliliters of methyl iodide was refluxed for one hour. The reaction mixture was cooled to room temperature and 100 milliliters of water added. The precipitated product was extracted twice with methylene chloride. The combined extracts were washed three times with water, dried over sodium sulfate and the solvent evaporated. The product was chromatographed over a column of Florisil and three grams of a crystalline product was eluted with a mixture composed of five percent of acetone and 95 percent of Skellysolve B. A portion of this product was recrystallized from methanol to yield needles of 6-iodomethylpregnanolone acetate melting at 155 to 160 degrees centigrade.

Analysis.—Calcd. for $C_{24}H_{37}O_3I$: C, 79.95; H, 9.37; I, 25.36. Found: C, 79.80; H, 9.67; I, 25.10.

$\nu_{max.}^{Nujol}$ 1718, 1695 and 1240 cm.$^{-1}$

In the same manner as shown in Example 7, except that 6-hydroxymethylpregnane-3,20-dione 3,20 - bis(ethylene ketal), 6-hydroxymethylpregnane-3,11,20-trione 3,20-bis-(ethylene ketal) and 6-hydroxymethyl-11-hydroxypregnane-3,20-dione 3,20-bis-(ethylene ketal) are the starting steroids, there is thus produced the corresponding 6-iodomethylpregnane-3,20-dione, 6-iodomethyl - 3,11,20-trione and 6-iodo-11-hydroxypregnane-3,20-dione.

In the same manner as shown in Example 7, except that another 6-hydroxymethyl-3-acyloxypregnan-20-one is the starting steroid, there is thus produced the corresponding 6-iodomethyl-3-acyloxy-5-pregnan-20-one.

In the same manner as shown in Example 7, except that the starting sterols employed are 6-hydroxymethylsitostanol, 6-hydroxymethylstigmastanol, 6-hydroxymethylergostanol, 6-hydroxymethylcholestanol and the like, there is thus produced the corresponding 6-iodomethylstanols.

EXAMPLE 8

6-dimethylaminomethyl-3-acetoxypregnan-20-one (6-dimethylaminopregnanolone acetate)

A mixture of four grams of 6-iodomethylpregnanolone acetate and fifteen milliliters of dimethylamine were sealed in a Parr bomb and heated on a steam-bath for one hour and ten minutes. The heating was stopped and the bomb cooled and opened. The excess amine was evaporated and the product partitioned between methylene chloride and water. The aqueous layer was made alkaline by the addition of ten percent sodium hydroxide solution. The product was extracted with methylene chloride. The solvent was removed and the product chromatographed on a column of Florisil. 2.24 grams of product was eluted from the column with twenty and thirty percent eluates of acetone in Skellysolve B. A portion of the product was recrystallized from Skellysolve B to yield crystals of 6-dimethylaminopregnanolone acetate melting at 118 to 119 degrees centigrade.

Analysis.—Calcd. for $C_{26}H_{43}O_3N$: C, 74.77; H, 10.37; N, 3.55. Found: C, 74.85; H, 10.31; N, 3.40.

$\nu_{max.}^{Nujol}$ 2760, 1720, 1695 and 1235 cm.$^{-1}$

In the same manner as shown in Example 8, except that 6-iodomethylpregnane-3,20-dione, 6-iodomethylpregnane-3,11,20-trione and 6-iodomethyl-11-hydroxypregnane-3,20-dione are the starting steroids, there is thus produced the corresponding 6-dimethylaminomethylpregnane-3,20-dione, 6-dimethylaminomethylpregnane-3,11,20-trione and 6-dimethylaminomethyl-11-hydroxypregnane-3,20 - dione.

In the same manner as shown in Example 8, except that a 6-iodomethyl-3-acyloxypregnane-3,20-dione is the starting steroid, there is thus produced the corresponding 6-dimethylaminomethyl-3-acyloxypregnane-3,20-dione.

In the same manner as shown in Example 8, except that the starting stanols are 6-iodomethylsitostanol, 6-iodomethylstigmastanol, 6 - iodomethylergostanol, 6 - iodomethylcholestanol and the like, there are thus produced the corresponding 6-dimethylaminomethylstanols.

EXAMPLE 9

*6-dimethylaminomethyl-3-actoxypregnan-20-one N-oxide (6-dimethylaminopregnanolone acetate N-oxide)*

1.77 grams of 6-dimethylaminomethylpregnanolone acetate was dissolved in five milliliters of methanol with ice-bath cooling. 2.5 milliliters of thirty percent hydrogen peroxide was added to the mixture which became almost solid. An additional ten milliliters of methanol was added to the mixture which was removed from the ice-bath. Following ten minutes of stirring at room temperature, the reaction mixture became a clear solution. The solution was stirred for eighteen hours at room temperature, heated until refluxing began and then cooled in an ice-bath. A small amount of a slurry of manganese dioxide in methanol was added and stirring continued at room temperature. After thirty minutes the evolution of oxygen had ceased and the mixture was filtered, then the solvent removed in vacuo. The residue was partitioned between methylene chloride and water and the solvent removed in vacuo. The product was chromatographed over a column of Florisil and 0.57 gram of the amine oxide compound was eluted with methanol. A portion of the product, 6-dimethylaminopregnanolone N-oxide, was recrystallized from Skellysolve B to yield crystals melting at 116 to 119 degrees centigrade and decomposing with evolution of gas at 130 degrees centigrade.

*Analysis.*—Calcd. for $C_{26}H_{43}NO_4 \cdot H_2O$: C, 69.14; H, 10.04; N, 3.10. Found: C, 69.10; H, 9.98; N, 3.41.

$\nu_{max}^{Nujol}$ 3580, 3500, 3350, 3170, 1707, 1697, 1252 and 1231 cm.$^{-1}$ In the same manner as shown in Example 9, except that 6 - dimethylaminomethylpregnane-3,20-dione, 6-dimethylaminomethylpregnane - 3,11,20 - trione and 6-di methylaminomethyl-11-hydroxypregnane-3,20 - dione are the starting steroids, there is thus produced the corresponding 6-dimethylaminomethylpregnane-3,20-dione N-oxide, 6-dimethylaminomethylpregnane-3,11,20-trione N-oxide and 6 - dimethylaminomethyl-11-hydroxypregnane-3,20-dione N-oxide.

In the same manner as shown in Example 9, except that another 6-dimethylaminomethyl-3-acyloxypregnane-3,20-dione is the starting steroid, there is thus produced the corresponding 6-dimethylaminomethyl-3-acyloxypregnan-3,20-dione N-oxide.

In the same manner as shown in Example 9, except that the starting stanols employed are 6-dimethylaminomethylsitostanol, 6 - dimethylaminomethylstigmastanol, 6 - dimethylaminomethylergostanol, 6 - dimethylaminoethylcholestanol and the like, there is thus produced the corresponding 6-dimethylaminomethylstanol N-oxides.

EXAMPLE 10

*6-methylene-3-acetoxypregnan-20-one (6- methylene-pregnanolone-3-acetate)*

3.84 grams of crude crystalline 6-dimethylaminomethylpregnanolone acetate N-oxide was heated in a wax bath at 130 to 140 degrees centrigrade under house vacuum for thirty minutes. After this time gas evolution had nearly ceased. The residue weighed 3.22 grams. The steroid product was leached out of the residue with several portions of boiling Skellysolve F (low-boiling pentane hydrocarbon) and chromatographed over a column of 200 grams of Florisil, synethetic magnesium silicate. 2.28 grams of the product was eluted from the column with mixtures composed of four percent acetone plus 96 percent Skellysolve B and five percent acetone plus 95 percent Skellysolve B. This product was recrystallized from Skellysolve F to yield 1.27 grams of 6-methylenepregnanolone-3-acetate with a melting point of 113 to 117 degrees centigrade.

*Analysis.*—Calcd. for $C_{24}H_{36}O_3$: C, 77.37; H, 9.74. Found: C, 77.21; H, 9.72.

$\nu_{max}^{Nujol}$ 1722, 1701, 1644, 1235, 1024 and 886 cm.$^{-1}$

The infrared spectrum is consistent with the structure proposed for this compound.

In the same manner as shown in Example 10, except that 6-dimethylaminomethylpregnan-3,20-dione N-oxide, 6-dimethylaminomethylpregnane-3,11,20-trione N-oxide and 6 - dimethylaminomethyl-11-hydroxypregnan-3,20-dione are the starting steroids, there is thus produced the corresponding 6-methylenepregnane-3,20-dione, 6-methylenepregnane-3,11,20-trione and 6-methylene-11-hydroxypregnane-3,20-dione.

In the same manner as shown in Example 10, except that another 6-dimethylaminomethyl-3-acyloxypregnane-3,20-dione N-oxide is the starting steroid, there is thus produced the corresponding 6-methylene-3-acyloxypregnane-3,20-dione.

In the same manner as shown in Example 10, except that the starting stanols employed are 6-dimethylaminomethylsitostanol N-oxide, 6-dimethylaminomethylstigmastanol N-oxide, 6-dimethylaminomethylergostanol N-oxide, 6-dimethylaminomethylcholestanol N-oxide and the like, there is thus produced the corresponding 6-methylenesitostanol, 6-methylenestigmastanol, 6-methylenergostanol, 6-methylenecholestanol and the like.

EXAMPLE 11

*6-methyl-5-pregnen-3β-ol-20-one formate (6-methyl-pregnenolone-3-formate)*

1.17 grams of 6-methylenepregnanolone-3-acetate was dissolved in ten milliliters of 98 percent formic acid and the mixture stirred at room temperature for ninety minutes. No change was apparent; so the mixture was heated on a steam bath for fifteen minutes. The reaction mixture became a deep purple. The solvent was removed in vacuo and the residue neutralized with an excess of sodium bicarbonate then extracted with methylene chloride. The extract was chromatographed over a column of 100 grams of Florisil synthetic magnesium silicate. The product was eluted from the column with a mixture composed of four percent acetone plus 96 percent Skellysolve B hexanes to yield 0.91 gram of crystalline solid. A portion of this product was recrystallized from Skellysolve B hexanes to yield crystals of 6-methylpregnenolone-3-formate with a melting point of 158 to 160 degrees centigrade.

*Analysis.*—Calcd. for $C_{23}H_{34}O_3$: C, 77.05; H, 9.56. Found: C, 76.97; H, 9.29.

$\nu_{max}^{Nujol}$ 1721, 1693, 1190, 1182 and 925 cm.$^{-1}$

Infrared spectral analyses indicated the presence of the formate at the 3 position.

EXAMPLE 12

*6-methyl-11-ketoprogesterone*

1.5 grams of 6-methylenepregnane-3,11,20-trione was dissolved in 25 milliliters of formic acid and heated on the steam-bath for one hour. The solvent was removed in vacuo and the residue neutralized with an excess of sodium bicarbonate, then extracted with methylene chloride. The extract was chromatographed over a column of 100 grams of Florisil. The product was eluted from the column with a mixture of five percent of acetone and 95 percent of Skellysolve B to yield 1.05 grams of crystalline 6-methyl-11-ketoprogesterone.

In the same manner as shown in Example 12, except that 6-methylenepregnane-3,20-dione and 6-methylene-11-hydroxy-pregnane-3,20-dione are the starting steroids, there is thus produced the corresponding 6-methyl-4-pregnene - 3,20 - dione and 6-methyl-11-hydroxy-4-pregnene-3,20-dione.

In the same manner as shown in Example 12, except that the starting stanols employed are 6-methylenesitostanol, 6-methylenestigmastanol, 6-methylenergostanol, 6-methylenecholestanol and the like, there is thus produced the corresponding 6-methylsitosterol, 6-methylstigmasterol, 6-methylergosterol, 6-methylcholesterol and the like.

EXAMPLE 13

6-methylprogesterone 0.07 gram of 6-methylpregnenolone 3-formate dissolved in five milliliters of xylene and 0.75 milliliter of cyclohexanone was heated until refluxing began. 0.10 gram of aluminum isopropoxide was added to the reaction mixture and refluxing was continued for 45 minutes. The flask containing the mixture was cooled, and ice was added. The solvents were removed by distilling in vacuo and the residue extracted with methylene chloride. The extracted product was chromatographed over a column of Florisil and eluted with varying proportions of a mixture of acetone in Skellysolve B. A mixture composed of five percent acetone plus 95 percent of Skellysolve B eluted eight milligrams of crystalline material with an infrared spectrum identical with the starting steroid. Elution of the column with acetone yielded eighteen milligrams of crystalline 6α-methylprogesterone. The compound presented an infrared spectrum identical with that of an authentic sample of 6α-methylprogesterone.

It is to be understood that the invention is not to be limited to the exact details of operation or exact compounds shown and described, as obvious modifications and equivalents will be apparent to one skilled in the art to which this invention pertains, and the invention is therefore to be limited only by the scope of the appended claims.

We claim:

1. 3,6,11,20-tetrasubstituted compounds of the pregnane series represented by the following formula:

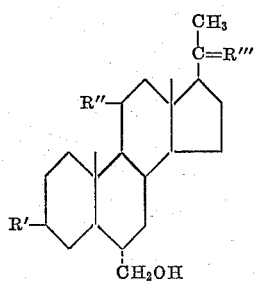

wherein R''' is selected from the group consisting of =O and a glycol ketal radical

wherein R is an alkylene radical containing from one to eight carbon atoms, inclusive, and the attaching oxygen to carbon bonds are separated by a chain of at least two and not more than three carbon atoms, inclusive, and wherein R'' is selected from the group consisting of hydrogen, hydroxy and keto and R' is selected from the group consisting of an acyloxy radical, AcO, wherein Ac is the acyl radical of a hydrocarbon carboxylic acid containing from one to twelve carbon atoms, inclusive, hydroxy and a glycol ketal radical

wherein R is an alkylene radical containing from one to eight carbon atoms, inclusive, and the attaching oxygen to carbon bonds are separated by a chain of at least two and not more than three carbon atoms, inclusive.

2. 6α-hydroxymethylpregnane-3,11,20-trione 3,20 - bis(ethylene ketal).

3. 6-α-hydroxymethyl-3-acetoxypregnan-20-one.
4. 6α-hydroxymethylsitostanol.
5. 3,6,11-trisubstituted steroids represented by the following formula:

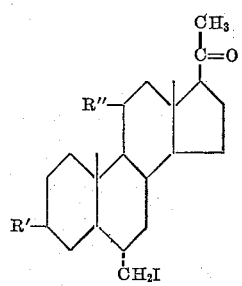

wherein R'' is selected from the group consisting of hydrogen, hydroxy and keto and R' is selected from the group consisting of an acyloxy radical, AcO, wherein Ac is the acyl radical of a hydrocarbon carboxylic acid containing from one to twelve carbon atoms, inclusive, hydroxy and keto.

6. 6α-iodomethyl-3-acetoxypregnan-20-one.
7. 3,6,11-trisubstituted steroids represented by the following formula:

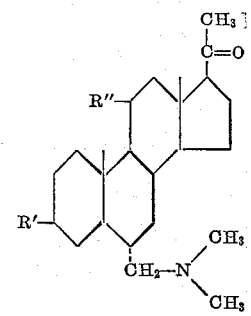

wherein R'' is selected from the group consisting of hydrogen, hydroxy and keto and R' is selected from the group consisting of an acyloxy radical, AcO, wherein Ac is the acyl radical of a hydrocarbon carboxylic acid containing from one to twelve carbon atoms, inclusive, hydroxy and keto.

8. 6α-dimethylaminomethyl-3-acetoxypregnan-20-one.
9. 3,6,11-trisubstituted steroids represented by the following formula:

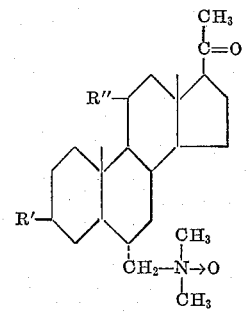

wherein R'' is selected from the group consisting of hydrogen, hydroxy and keto and R' is selected from the group consisting of an acyloxy radical AcO, wherein Ac is the acyl radical of a hydrocarbon carboxylic acid containing from one to twelve carbon atoms, inclusive, hydroxy and keto.

10. 6α - dimethylaminomethyl - 3 - acetoxypregnan-20-one N-oxide.

11. 3,6,11-trisubstituted steroids represented by the following formula:

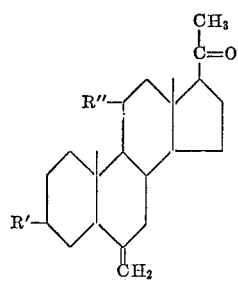

wherein R″ is selected from the group consisting of hydrogen, hydroxy and keto and R′ is selected from the group consisting of an acyloxy radical, AcO, wherein Ac is the acyl radical of a hydrocarbon carboxylic acid containing from one to twelve carbon atoms, inclusive, hydroxy and keto.

12. 6-methylene-3-acetoxypregnan-20-one.

13. A process for the production of a 6α-methyl steroid compound selected from the class consisting of the androstane, pregnane and sterol series which comprises: hydroxymethylating at the 6-position of the nonconjugated double bond a member of the group consisting of a compound of the androstane, pregnane and sterol series, the 3-acylate, and 3,20-bisketal thereof by reacting said compound with carbon monoxide and hydrogen in the presence of an operative catalyst under superatmospheric pressure to produce a 6α-hydroxymethyl compound; halogenating the thus produced 6α-hydroxymethyl compound to produce a 6α-halomethyl compound; reacting the thus produced 6α-halomethyl compound with a dialkylamine to produce a 6α-dialkylaminomethyl compound; oxidizing the thus produced 6α-dialkylaminomethyl compound with an oxidizing agent to produce the amine oxide of a 6α-dialkylaminomethyl compound; decomposing the thus produced amine oxide of a 6α-dialkylaminomethyl compound by heat to produce a 6-methylene compound; dissolving in 90–98 percent formic acid and heating to produce a 6α-methyl compound selected from the group consisting of a compound of the androstane, pregnane and sterol series.

14. A process for the production of a 6α-dimethylaminomethyl steroid compound selected from the class consisting of 5α-androstanes, 5α-pregnanes and 5α-stanols which comprises: (1) hydroxymethylating at the 6-position of the nonconjugated double bond a member of the group consisting of a compound of the androstane, pregnane and sterol series, the 3-acylate, and 3,20-bisketal thereof by reacting said compound with carbon monoxide and hydrogen in the presence of an operative catalyst under superatmospheric pressure to produce a 6α-hydroxymethyl compound selected from the group consisting of 5α-androstanes, 5α-pregnanes, 5α-stanols and the 3-acylates, and 3,20-bisketals thereof; (2) halogenating the thus produced 6α-hydroxymethyl compound to produce a 6α-halomethyl compound and (3) reacting the thus produced 6α-halomethyl compound with a dialkylamine to produce a 6-dialkylaminomethyl compound selected from the group consisting of 5α-androstanes, 5α-pregnanes, 5α-stanols and the 3-acylates, and 3,20-bisketals thereof.

15. Process according to claim 13, characterized by the steroid compound undergoing 6-hydroxymethylation being represented by the following formula:

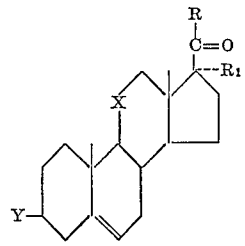

wherein:
Y=a member of a group consisting of ketal, hydroxy and acyloxy;
X=a member of a group consisting of methylene, hydroxymethylene and carbonyl;
R=a member of group consisting of methyl, hydroxymethyl and acyloxymethyl;
R₁=a member of a group consisting of hydrogen, hydroxy and acyloxy.

16. A compound of the formula

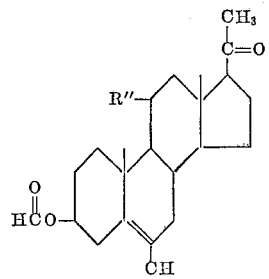

wherein R″ is selected from the group consisting of hydrogen, hydroxy and keto.

17. 6-methyl-5-pregnen-3β-ol-20-one formate.

18. A process for the production of a 6α-hydroxymethyl compound selected from the class consisting of the androstane, pregnane, and sterol series which comprises: hydroxymethylating at the 6-position of the nonconjugated double bond a member of the group consisting of a compound of the androstane, pregnane, and sterol series, the 3-acyloxy and 3,20-bisketal thereof containing a non-conjugated double bond in the 5,6-position by reacting said compound with carbon monoxide and hydrogen in the presence of an operative catalyst under superatmospheric pressure to produce said 6α-hydroxymethyl compound.

19. A process according to claim 18 wherein the starting material is 5-pregneneolone acetate, the catalyst is dicobalt carbonyl and the product is 6α-hydroxymethyl-3β-acetoxypregnan-20-one.

20. A process for the production of a 6α-dialkylaminomethyl compound selected from the class consisting of the androstane, pregnane, and sterol series which comprises: hydroxymethylating at the 6-position of the nonconjugated double bond a member of the group consisting of a compound of the androstane, pregnane, and sterol series, the 3-acyloxy and 3,20-bisketal thereof containing a non-conjugated double bond in the 5,6-position by reacting said compound with carbon monoxide and hydrogen in the presence of an operative catalyst over superatmospheric pressure to produce said 6α-hydroxymethyl steroid compound halogenating the thus-produced 6α-methyl compound to produce a 6α-halomethyl compound; reacting the thus-produced compound with a dialkylamine to produce a 6α-dialkylaminoethyl compound.

21. A process according to claim 20 wherein the starting material is 5-pregneneolone acetate, the catalyst is dicobalt carbonyl, and the product is 6α-dimethylaminomethyl-3-diacetoxypregnan-20-one.

22. Process according to claim 13, characterized by the steroid compound undergoing 6α-hydroxymethylation being represented by the formula:

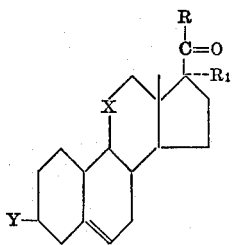

wherein:
Y = a member of the group consisting of ketal, hydroxy and acyloxy;
X = a member of the group consisting of methylene, hydroxymethylene and carbonyl;
R = a member of the group consisting of methyl, hydroxymethyl and acyloxymethyl;
$R_1$ = a member of the group consisting of hydrogen, hydroxy and acyloxy.

References Cited by the Examiner

UNITED STATES PATENTS

| | | | |
|---|---|---|---|
| 2,778,840 | 1/57 | Schaltegger | 260—397.2 |
| 2,842,566 | 7/58 | Rosselet | 260—397.3 |
| 2,842,572 | 7/58 | Merr | 260—387.45 |
| 2,871,246 | 1/59 | Loken | 260—397.4 |
| 2,878,247 | 3/59 | Miramontes et al. | 260—397.4 |
| 2,901,493 | 8/59 | Chemerda | 260—397.2 |

OTHER REFERENCES

Burn et al.: "Journal Chem. Soc.," September 1957, pages 4092, 4098 relied on.

LEWIS GOTTS, *Primary Examiner.*

B. E. LANHAM, L. H. GASTON, MORRIS LIEBMAN,
*Examiners.*